May 19, 1931. A. WEISS 1,806,136
STEERING DEVICE
Filed Dec. 31, 1928
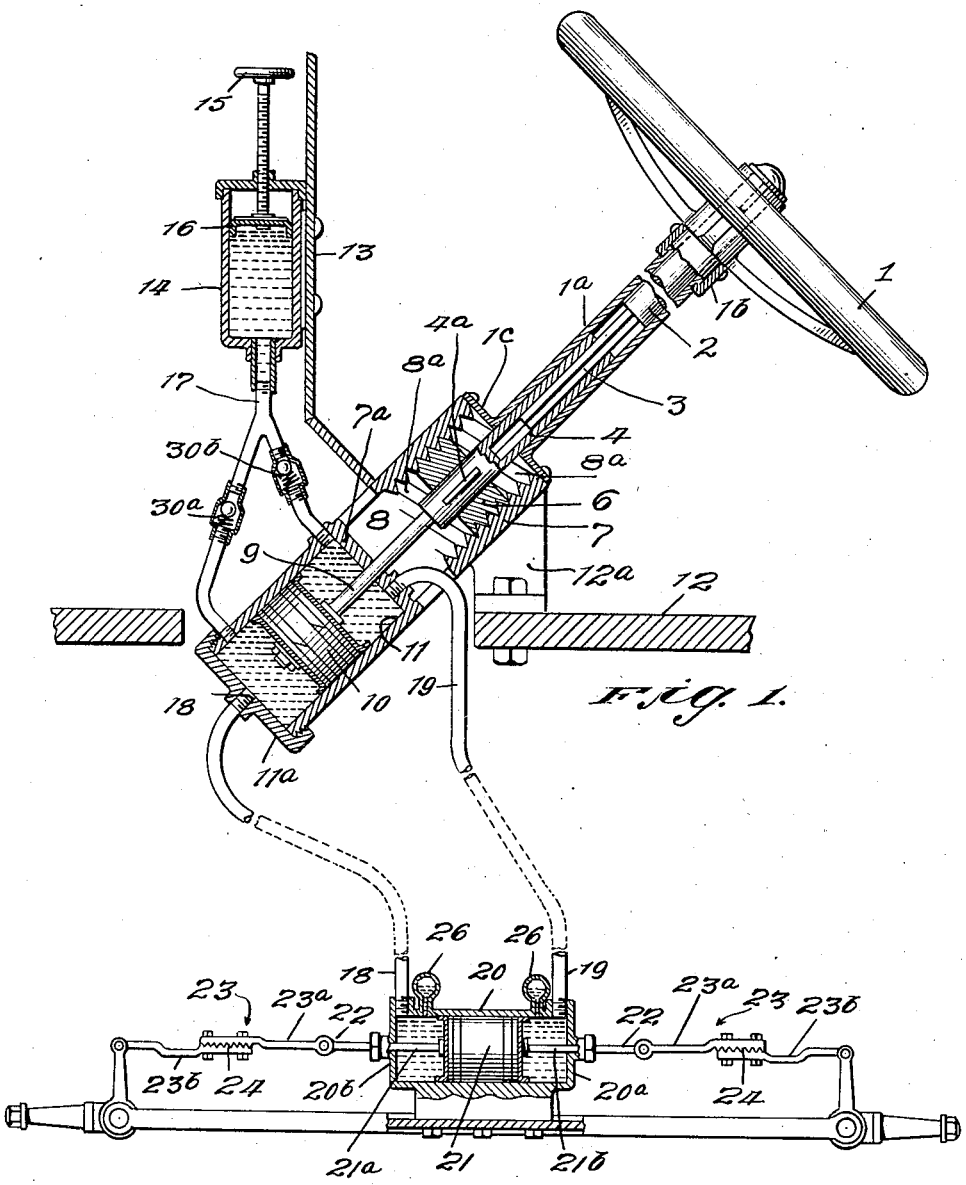
Fig. 1.
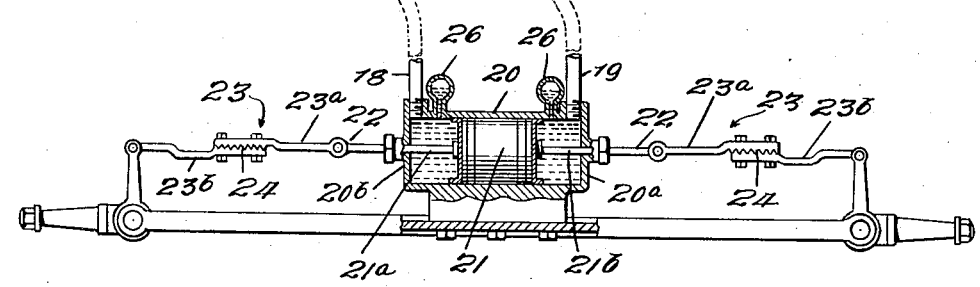
Fig. 2.
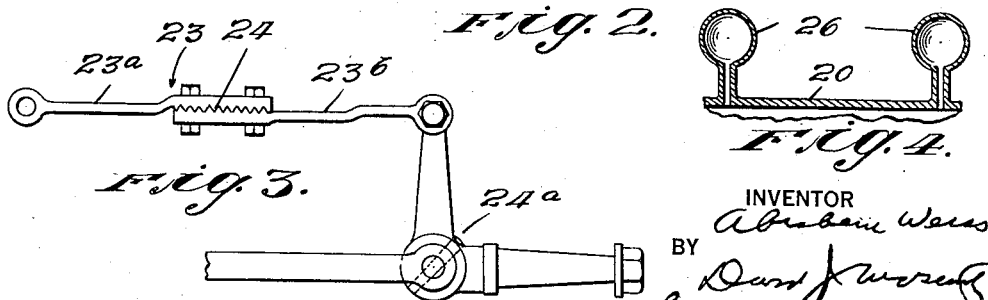
Fig. 3.
Fig. 4.
INVENTOR
Abraham Weiss
BY
his ATTORNEY Patented May 19, 1931

1,806,136

UNITED STATES PATENT OFFICE

ABRAHAM WEISS, OF NEW YORK, N. Y.

STEERING DEVICE

Application filed December 31, 1928. Serial No. 329,528.

This invention relates to improvements in steering devices, being particularly directed to a system of control, wherein the directional actuation of a motor vehicle is controlled by hydraulic pressure.

Broadly, it is an object of this invention to provide a steering mechanism, so constructed, as to provide for the directional actuation of a motor vehicle through pressure imparted through hydraulic influence mechanisms, whose action is initiated and controllable, by the operation of the steering wheel.

Specifically, it is aimed to provide a hydraulically influenced steering mechanism, comprising a steering wheel, having thereon means for exerting a pressure upon fluid, whereby such fluid under pressure, is caused to function upon a second pressure device, for actuating the elements interconnected with the wheels of a vehicle, whereby to transmit the angular movement of the steering wheel into a directional movement of the vehicle wheel.

Further, it is aimed to provide a fluid pressure steering mechanism, so constructed as to necessitate only a slight turn of the steering wheel, in order to cause a positive directional actuation of the vehicle wheel.

Still further, it is aimed to provide a system whereby the slight actuation of a steering wheel brings about a positive directional movement in the proper direction of the vehicle wheel, at the same time eliminating the shocks which usually are transmitted from the vehicle wheel to the steering wheel, in the present type of device, as the vehicle wheel progresses over uneven surfaces or veers slightly in one direction or another.

Still further, it is aimed to provide a series of fluid pressure devices, one relatively larger than the other, whereby a slight movement of the steering mechanism, as transmitted to one of said pressure devices, is caused to be magnified considerably through the medium of the second of such devices, with the resultant proportionate directional activity of a vehicle wheel.

These and other advantages, capabilities, and features of the invention will appear from the subjoined detail description of one specific embodiment therefor illustrated in the accompanying drawings, in which Figure 1, is a sectional side view, showing the steering mechanism.

Figure 2, is a plan view, partly in section, of the front axle, with the elements thereon shown in their relation to the structure shown in Figure 1.

Figure 3, is a detail of the knuckle structure.

Figure 4, is a detail sectional view of the front elevation, showing the structure of the second fluid chamber.

Referring to the reference characters in the drawing, numeral 1, represents a steering wheel of the type commonly used in motor vehicles, which steering wheel has attached thereto, a shaft, a section of which is round as at 2, at the end of which round section, there is formed a squared projection 3, the shaft 2, of the squared portion 3, being contained in the casing member 1a, and the steering wheel proper, being held from lateral displacement from said casing 1a, by means of a collar 1b.

Within the casing 1a, there is positioned a movable cylinder or hollow rod 4, whose interior is squared, so as to have fitting therein, the squared portion 3, extending from the steering wheel 1.

The casing 1, at its extremity, has a projecting flange 1c, which is attached to the cylinder 7, which cylinder is fixed to the chassis or frame work of the car 12, as by a bracket 12a. This cylinder is divided into two sections, separated by a central wall 7a, forming two chambers 8 and 11. The chamber 8, is interiorly threaded as at 8a, to provide for contact with a screw member 6, which screw member is fixed to the cylindrical rod 4, as by means of a key 4a, the rod being extended in the form of a piston 9, passing through an aperture in the wall 7a, the purpose of which will be later described.

Referring to Figure 1, there is attached to the rod 9, in the chamber 11, a piston member 10, provided with the usual piston rings and leather washers, which piston is adapted to displace fluid herein, in the form of oil, through outlets 18 and 19, formed respectively in the end 11a, and the wall 7a, forming the boundary of said piston chamber.

A plurality of outlets are formed in the side wall of the cylinder, which outlets lead to means of connected pipes or hose 17, forming conduits to a screw operated feed pump 14, mounted on the dashboard 13, and which feed pump is adapted to form a reservoir of oil, for maintaining the proper amount of fluid in the fluid chamber 11, by means of the actuation of a plunger 16 therein, through the control of the hand wheel 15, check valves 30a and 30b, are formed in the respective arms of the feed pipe 17, for allowing the fluid to be forced from the reservoir into the chamber, but preventing any flow of fluid back from the compression chamber into the reservoir.

Referring to Figure 2, there is there shown, a chamber 20, in the form of a cylinder, though the shape and size of the same may be varied, in accordance with the type of vehicle in use, in which cylindrical chamber, there is adapted to be positioned a piston 21, having on opposite sides thereof, fluid which is fed into the chamber, through means of the feed pipes 18 and 19, leading from the compression chamber 11, piston rods 21a and 21b, fixed to the piston 21, and projecting in opposite directions through the end walls 20a and 20b, of the piston chamber 21, are adapted to be interconnected to the knuckle mechanism, for actuating the wheels of the vehicle as will be further described, through the universal joint 22, shown in Figure 4, the connection between the piston rod and the wheel comprises an adjustable tie rod comprising two elements 23a and 23b, having teeth 24, formed therein for positioning the same in the desired relationship, whereby proper connection of the members 23b may be made to the ball bearing universal joint 25, shown in Figure 4, leading to the knuckle spindle 24, which is directly connected to the vehicle wheel.

It will be seen that the first pressure chamber 11, is considerably larger than the second pressure chamber, 20, with the result that slight displacement of the piston 10, will cause a comparatively considerable displacement of piston 21, which when translated to the vehicle wheel produces a considerable directional actuation.

In operation the device functions as follows: Let it be understood that a right turn is desired to be taken. In that case the steering wheel 1, is turned to the right, causing the squared rod 3, associated with the steering wheel to actuate the hollow cylinder or rod 4, carried in the casing 1a, which hollow cylinder is adapted to reciprocate in said cylinder and which rod is fixed to the screw 6, causing the same to be displaced downwardly, and carried with it of course, the rod 4, and its projection 9, forming the piston rod, which is interconnected with the piston 10, in the compression chamber 11, displacement downwardly of the piston 10, in the chamber 11, causes fluid to be pressed through conduit 18, in the left side of the chamber 20, and causes fluid from the chamber 20, to be urged through conduit 19, into the upper section of the compression chamber 11.

This flow of fluid into the left side of the cylinder 20, causes the piston against which the fluid acts, to be displaced towards the right and causes piston rod 21b, and the tie rod 23, to act upon the knuckle spindle 24, thereby displacing the vehicle wheel towards the right.

In order that any displacement to the left or right of the vehicle wheel, due to contact thereof with foreign substances or ruts in the road may not be transmitted to the steering wheel through a reversal of the above operation, a plurality of air chambers 26, as shown in Figure 5, are formed on opposite sides of the fluid chamber 20, so that shocks originating as above and transmitted by the tie rods to the piston 20, and to the fluid in the chamber 20, may be absorbed and compensated for by the cushioning effect of the air being compressed in such air chamber.

It is obvious that various changes and modifications may be made to the details of construction without departing from the general spirit of the invention as set forth in the appended claims.

I claim:

1. A control for steering mechanism in motor vehicles, comprising a steering wheel, a squared shaft associated with said steering wheel, a hollow rod having a squared interior cooperating with said shaft, a casing having a fluid chamber, and a driving chamber through which said rod passes, means in said driving chamber and interlocked with said rod for causing the same to reciprocate upon rotation of said steering wheel, a plunger at the end of said rod contacting with fluid in said fluid chamber, ports through which fluid may pass upon displacement of said plunger, and means operable through displacement of fluid through one of said respective ports, to cause the contemplated directional displacement of a vehicle.

2. A control for steering mechanism in motor vehicles, comprising a steering wheel, a squared shaft extending from said steering wheel, a hollow rod interiorly squared to rotate with and reciprocate along said squared shaft, a casing comprising two compartments through which said rod passes, said casing being interiorly threaded in one compartment, and having, cooperating therewith, a nut keyed to said rod, fluid in the second of said compartments, ports at opposite ends of said second compartment, through which fluid may flow, and a plunger fixed to the extremity of said rod for contacting with the fluid, whereby fluid may be displaced through one of said ports, and drawn in from the other of said ports, whereby to cause a directional change of movements of wheels of a motor vehicle.

ABRAHAM WEISS.